United States Patent Office 3,320,325
Patented May 16, 1967

3,320,325
PRODUCTION OF IMPROVED PARTICULATE SALTS
Alexander H. Widiger, Jr., and Edward C. Staehling, Midland, Mich., assignors to The Dow Chemical Company, Midland, Mich., a corporation of Delaware
No Drawing. Filed Apr. 2, 1964, Ser. No. 356,958
5 Claims. (Cl. 260—623)

This invention relates to a method for making solid particulate salts of improved quality. It is particularly concerned with a method whereby these materials are rendered essentially free of irritating dust or vapors and are made more completely soluble in water.

In the production of such materials, the particulate solid is commonly obtained as beads, flakes, or other such granules by a drying process wherein a liquid slurry or solution is dispersed and heated to remove the liquid component, usually water. This can be accomplished by contacting droplets of the fluid material with a hot gas as in spray or fluidized bed drying or it can also be done by contacting the material with a hot surface as in a rotary drier, a flaker, or other such apparatus. In some cases, the drying process causes some decomposition of the salt and the product may then have a low assay, undesirable physical properties, or other drawback. For example, ammonium or amine salts may lose some ammonia or amine by decomposition and volatilization. Salts of weak acids can be decomposed by contact with carbon dioxide as in spray or fluid bed drying where liquid droplets are contacted with hot flue gas. The product in either case contains some of the free acid and, in the latter case, it may also be contaminated with a carbonate. This situation exists particularly in the drying of salts, which are decomposed to some signficant extent by carbon dioxide, for example alkali metal borates, phenates, and silicates where it is desirable for many purposes to have present a small excess of free caustic alkali to ensure complete solution in water of the salt and the caustics-soluble impurities which are often present.

We have found that certain salts such as described above, where some of the alkali has been lost or rendered ineffective, are improved in quality when a quantity of the corresponding base at least equivalent to that lost during the drying step is applied to the dried salt particles or granules as an aqueous solution. More specifically, we have found that particulate alkali metal phenates, particularly those which are produce in bead or granule form by a drying process involving contact with a substantial quantity of carbon dioxide, have unexpectedly improved properties when they are treated in this fashion.

Alkali metal salts of phenols such as pentachlorophenol, tetrachlorophenol, trichlorophenol, 4-chloro-m-cresol, o-phenylphenol, and the like are commonly employed in water solution to impregnate textiles, paper products, and wood to protect these materials against fungal or other microbial attack. These phenates are ordinarily the sodium salts which are produced commercially in granular form such as flakes or beads.

These particulate or granular phenates characteristically have present an appreciable amount of fine dust which is impossible to remove, even by careful screening. Sublimed phenolic vapors are also usually present. The rapidity with which this dust and vapor pervades a handling area and the intense irritation they cause in the nose and throat make handling these materials a disagreeable problem. In addition to the handling difficulty, such phenates often contain small amounts of insoluble impurities such as aluminum hydroxide and acidic organic materials which cause undesirably turbid water solutions unless some free caustic is present. Phenates exposed during drying to appreciable concentrations of carbon dioxide are deficient in effective alkali, giving turbid solutions of relatively low pH. Some free phenol is often present in these materials.

It has now been found that particulate alkali phenates such as described above which are characterized by the presence of irritating dust, phenolic vapors, and incomplete solubility in water are greatly improved in these respects when the dried particulate solids are essentially uniformly wet with a small amount of aqueous alkali metal hydroxide solution of not more than about 25% by weight concentration. About 1-7% of solution based on the weight of the granular phenate is required to wet the solid uniformly and still retain its dry appearance and its free-flowing properties. Aqueous alkali hydroxide of greater than about 25% concentration does not wet the particles uniformly and causes caking and undesirable resistance to flow. Although solutions as dilute as 1% by weight concentration can be used effectively, for practical reasons it is preferred to use solutions of at least about 5% concentration. Wetting solutions of 10-20% concentration are preferred.

The addition to the solid phenate of 0.1-2% by weight of a humectant such as glycerol or propylene gylcol gives a somewhat improved product. The humectant can be incorporated in the alkali solution for ease of addition to the particulate solid.

By the terms particulate or granular phenates is meant solids of about 10-100 mesh. The present process is not applicable to powders composed of smaller sized particles since such powders would tend to cake and lose their free-flowing properties when so treated. The process is not advantageous when applied to solids of greater size than about 10 mesh. The process is particularly advantageous as applied to granular material of about 20-50 mesh.

For best results, the particulate solid phenate is treated as described above so as to contain about 1-15 mole percent of excess free alkali metal hydroxide based on the phenate. About 3-10 mole percent of excess base is preferred. By excess is meant in excess of that amount of base required to react with any free phenol which may be present in the untreated product.

The particulate phenates treated by this process are essentially dust-free and substantially odorless, and give clear solutions when dissolved in water for use. The granular solids are dry in appearance and are free-flowing and resistant to caking. They may be handled in the open without resort to hoods or specialized masks and with only the normal precautions against contact of an irritating solid with the skin.

Examples 1 and 2 illustrate the application of the present process to spray-dried sodium pentachlorophenate, a product wherein irritating dusts and fumes pose a particular difficult handling problem.

EXAMPLE 1

Beads of sodium pentachlorophenate were produced by drying a concentrated aqueous solution of the salt using large quantities of hot flue gas as the drying medium. The beads were screened to obtain a product of 20-40 mesh. Although the original aqueous solution had contained an appreciable quantity of free sodium hydroxide, carbon dioxide in the drying flue gas had neutralized much of this and the finished beads contained little or no free sodium hydroxide. The beads were slightly dusty, even after screening, and caused considerable sneezing when handled by unprotected personnel. When the beads were dissolved in distilled water to make a 10% solution, a turbid solution of about pH 10.3 was formed.

One hundred pounds of these beads were put in a rotary mixer and with the mixer in operation, three pounds of 20% aqueous sodium hydroxide solution was poured over the beads. After a few minutes of mixing, the beads were of uniform dry appearance and were free-flowing. The treated beads caused no sneezing when handled and they dissolved in distilled water to form a clear 10% by weight solution of about pH 11.8. Analysis showed the presence of 1% by weight free NaOH in the treated beads. Addition of 0.1–2%, preferably about 1%, of a humectant such as glycerol or propylene glycol to the treated beads gives a product which retains its advantageous properties for longer periods of storage.

EXAMPLE 2

Samples of untreated beads of sodium pentachlorophenate produced as described in Example 1 were thoroughly mixed with aqueous NaOH solutions of various concentrations in sufficient quantity to provide a final product containing 1% of free NaOH based on the weight of sodium pentachlorophenate. The results are listed in the table below.

| NaOH solution, wt. percent conc.: | Appearance of treated beads |
|---|---|
| 7.5 | Wet, not free-flowing. |
| 10 | Dry, flowed freely. |
| 20 | Dry, flowed freely. |
| 30 | Balled, not free-flowing. |
| 50 | Not free-flowing, could not be uniformly mixed. |

Beads treated with NaOH solutions of 10% and 20% concentration were dust-free and caused no irritation of the nose or throat when poured from one container into another. These beads dissolved in water to give clear solutions.

By the procedure described above, granular salts such as the sodium or potassium salts of 4-chloro-m-cresol, o-phenylphenol, trichlorophenol, tetrachlorophenol, and similar phenols are sprayed or otherwise wet with about 1–7 weight percent of aqueous alkali hydroxide to provide substantially dust-free and odorless materials containing from about one to about fifteen mole percent of free alkali based on the phenate. These treated materials dissolve in water to yield clear homogeneous strongly alkaline solutions.

We claim:
1. In a process wherein a dispersed aqueous alkali metal phenate is thermally dried to produce a particulate solid and wherein said phenate is the alkali metal salt of pentachlorophenol, tetrachlorophenol, trichlorophenol, chlorocresol, or phenylphenol, the improvement which consists of essentially uniformly wetting said solid with sufficient aqueous alkali metal hydroxide solution to provide a wetted particulate solid containing from about one to about 15 mole percent of free alkali metal hydroxide.

2. The process of claim 1 wherein about 0.1–2% by weight of a humectant is additionally added to the phenate.

3. The process of claim 1 wherein the phenate is sodium pentachlorophenate and the alkali metal hydroxide is sodium hydroxide.

4. The process of claim 3 wherein there is added to the solid sodium pentachlorophenate 0.1–2% by weight of a humectant.

5. The process of claim 1 wherein the phenate is the alkali metal salt of pentachlorophenol.

No references cited.

LEON ZITVER, *Primary Examiner.*

W. LONE, *Assistant Examiner.*